(12) United States Patent
Yoakum et al.

(10) Patent No.: US 10,154,391 B2
(45) Date of Patent: Dec. 11, 2018

(54) COVERT TRANSMISSION OF AN ASSISTANCE REQUEST MESSAGE FROM A WEARABLE DEVICE

(71) Applicant: Avaya Inc., Santa Clara, CA (US)

(72) Inventors: John H. Yoakum, Cary, NC (US); Tony McCormack, Galway (IE)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 14/809,734

(22) Filed: Jul. 27, 2015

(65) Prior Publication Data

US 2017/0034680 A1 Feb. 2, 2017

(51) Int. Cl.

| G04G 21/06 | (2010.01) |
| H04W 4/02 | (2018.01) |
| H04B 1/3827 | (2015.01) |
| H04W 52/02 | (2009.01) |
| G04G 21/08 | (2010.01) |
| G08B 25/01 | (2006.01) |
| H04W 4/22 | (2009.01) |

(Continued)

(52) U.S. Cl.
CPC .............. *H04W 4/22* (2013.01); *G04G 21/06* (2013.01); *G04G 21/08* (2013.01); *G08B 25/016* (2013.01); *G10L 15/22* (2013.01); *H04B 1/385* (2013.01); *H04W 4/02* (2013.01); *H04W 4/90* (2018.02); *H04W 52/027* (2013.01); *H04M 1/72541* (2013.01); *Y02D 70/00* (2018.01); *Y02D 70/1242* (2018.01); *Y02D 70/1262* (2018.01); *Y02D 70/142* (2018.01); *Y02D 70/144* (2018.01); *Y02D 70/26* (2018.01); *Y02D 70/40* (2018.01)

(58) Field of Classification Search
CPC ....... H04W 4/22; H04W 4/02; H04W 76/007; G08B 25/016; G08B 21/0277; H04M 11/04; H04M 1/7253; H04M 1/72538; H04M 11/045; H04M 1/72536; H04M 1/72541

See application file for complete search history.

(56) References Cited

U.S. PATENT DOCUMENTS 8,705,702 B1 * 4/2014 Sieg ...................... H04M 11/04
379/45
2010/0273452 A1 * 10/2010 Rajann .................... H04W 8/22
455/411

(Continued)

OTHER PUBLICATIONS

Author Unknown, "First Sign," First Sign Technologies, Date Published: Unknown, Date Accessed: Dec. 1, 2015, 4 pages, http://www.firstsign.us/.

(Continued)

*Primary Examiner* — Nam Huynh
(74) *Attorney, Agent, or Firm* — Sheridan Ross P.C.

(57) ABSTRACT

Methods and apparatuses for covert transmission of an assistance request message from a wearable computing device are disclosed. In one embodiment, a wearable computing device receives a covert input and transmits a corresponding assistance request message without presenting an indication that such a request message is being, or has been, transmitted. Thus, a user in an emergency situation, which may worsen if a corresponding perpetrator detects a call for emergency assistance, can use the wearable computer device to send an assistance request message in a covert manner.

19 Claims, 9 Drawing Sheets

(51) Int. Cl.
*G10L 15/22* (2006.01)
*H04W 4/90* (2018.01)
*H04M 1/725* (2006.01)

(56) References Cited

U.S. PATENT DOCUMENTS

| | | | | |
|---|---|---|---|---|
| 2011/0319048 | A1* | 12/2011 | Matlock | G08B 25/006 |
| | | | | 455/404.1 |
| 2015/0065082 | A1* | 3/2015 | Sehgal | H04W 4/22 |
| | | | | 455/404.2 |
| 2015/0222738 | A1* | 8/2015 | Sood | H04M 19/04 |
| | | | | 340/539.11 |
| 2015/0269835 | A1* | 9/2015 | Benoit | G08B 25/10 |
| | | | | 340/539.13 |
| 2015/0348389 | A1* | 12/2015 | Jang | H04W 4/22 |
| | | | | 455/404.1 |
| 2015/0358451 | A1* | 12/2015 | Cronin | H04B 1/385 |
| | | | | 455/420 |

OTHER PUBLICATIONS

Moriber, Jason, "6 Emergency Wearables for Women," Verizon Wireless News Center, Oct. 28, 2014, 5 pages, http://www.verizonwireless.com/news/article/2014/10/6-emergency-wearables-for-women.html.

* cited by examiner

COVERT TRANSMISSION OF AN ASSISTANCE REQUEST MESSAGE FROM A WEARABLE DEVICE

TECHNICAL FIELD

The disclosure relates generally to sending messages from a wearable device and, in particular, the covert transmission of an assistance request message from a wearable device.

BACKGROUND

A personal emergency alarm system may allow a user to activate an alarm during an emergency situation to call the attention of nearby persons. The personal emergency alarm system may also allow the user to send an assistance request message to a designated recipient. However, in some emergency situations, a user may not safely be able to activate an alarm or send an assistance request message. For example, a person being held against his or her will by a perpetrator may not activate an alarm, or send an assistance request, for fear of immediate retaliation by the perpetrator.

Advances in computing and electronics technology allow for the use of so-called "wearable devices." A wearable device in the form of a watch, for example, may provide functions beyond simple display of time, such as fitness tracking, notifications, and text messaging. The wearable device may communicate with other devices, such as a smartphone, a tablet computer, or a personal computer, to exchange information related to one or more of its functions. For example, a wearable device in the form of a fitness tracker may communicate with a smartphone to provide information about a user's physical activity, which the smartphone may then process and present to the user. Some features of wearable devices may be enabled/accessed at the wearable device through a user interface. A wearable device in the form of a watch, for example, may notify a user about a new message through a display, and may even allow the user to open the message through a touch-screen interface and read the message on the display.

SUMMARY

The embodiments relate to a covert transmission of an assistance request message from a wearable device. In a non-limiting embodiment, a wearable device receives a covert input and transmits a corresponding assistance request message without presenting an indication that such a request message is being, or has been, transmitted. Thus, a user under an emergency situation, which may worsen if a corresponding perpetrator detects a call for assistance, can use the wearable device to send a covert assistance request message in a covert manner.

In that regard, in one embodiment, a method for sending a message is provided. The method includes placing, by a wearable computing device comprising a processor, the wearable computing device in a presentation mode. The method further includes detecting a first user input, determining that the first user input is a first covert input, generating a first message corresponding to the first covert input, and transmitting, to a personal computing device, the first message without altering the presentation mode. This allows the user of the wearable computing device to send an assistance request message to a personal computing device in a covert manner.

In another embodiment, a computing device for sending a message is provided. The computing device includes a communication interface configured to communicate with a personal computing device and includes a processor, coupled to the communication interface. The processor is configured to place the wearable computing device in a presentation mode and detect a first user input. The processor is further configured to determine that the first user input is a first covert input, generate a first message corresponding to the first covert input, and transmit, to the personal computing device, the first message without altering the presentation mode.

In another embodiment, a computer program product for sending a message is provided. The computer program product is stored on a non-transitory computer-readable storage medium and includes instructions configured to cause a processor to carry out a plurality of steps. The computer program product causes the processor to place the wearable computing device in a presentation mode. The computer program product further causes the processor to detect a user input, determine that the user input is a covert input, generate a message corresponding to the covert input, and transmit, to a personal computing device, the message without altering the presentation mode.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

The embodiments relate to a covert transmission of an assistance request message from a wearable computing device. In a non-limiting embodiment, a wearable computing device receives a covert input and transmits a corresponding assistance request message without presenting an indication that such a request message is being, or has been, transmitted. Thus, a user in an emergency situation, which may worsen if a corresponding perpetrator detects a call for assistance, can use the wearable computing device to send a covert assistance request message in a covert manner.

Figure 1:
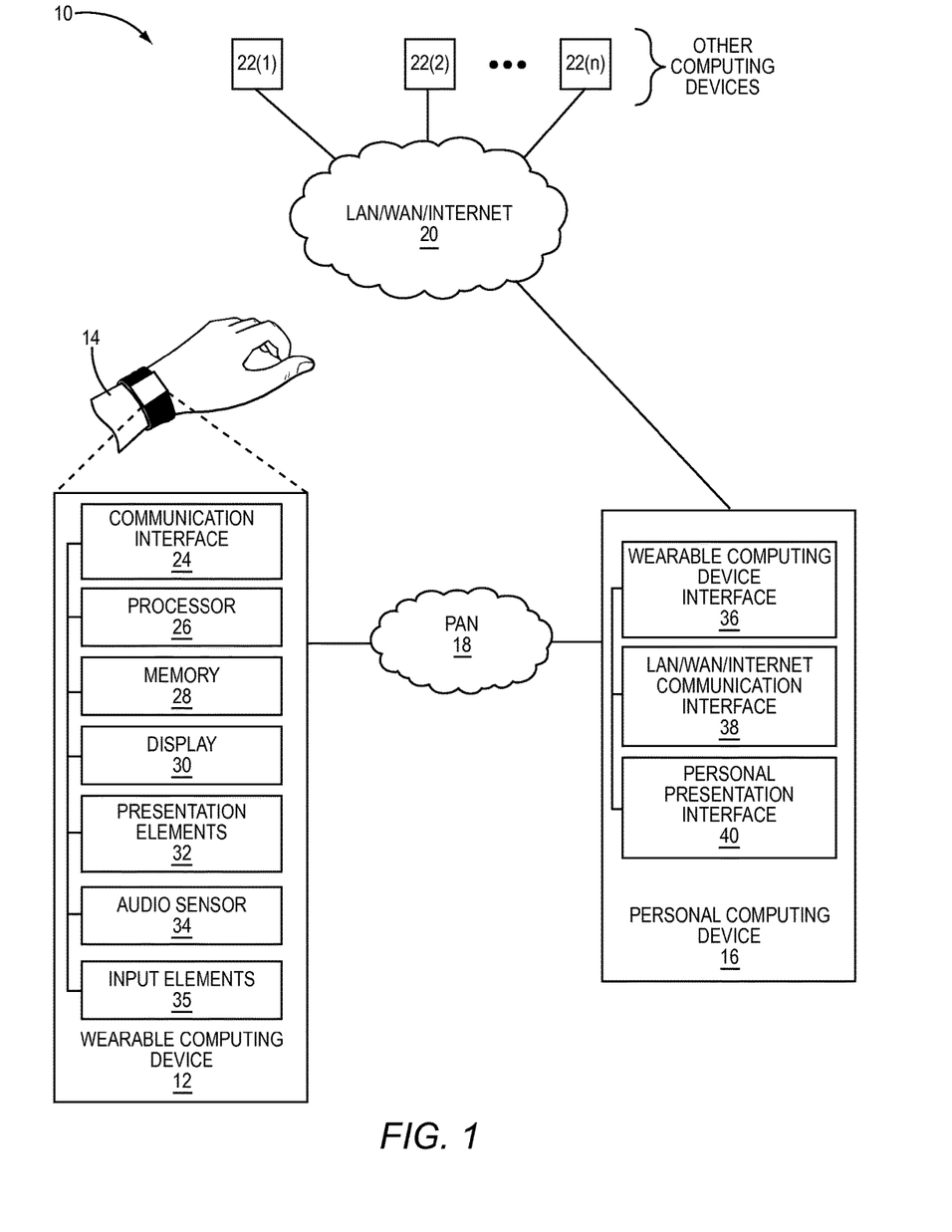
FIG. 1 is a block diagram of a system in which embodiments may be practiced.

In this regard, FIG. 1 is a block diagram of a system 10 in which embodiments may be practiced. The system 10 includes a wearable computing device 12 worn by a user 14. The system 10 further includes a personal computing device 16 communicatively coupled to the wearable computing device 12 via a personal area network (PAN) 18. The personal computing device 16 is also communicatively coupled to a local area network (LAN), wide area network (WAN), or Internet network 20 (referred to herein as "LAN/WAN/Internet 20") to communicate with other computing devices 22(1)-22(n) (generally, computing devices 22) communicatively coupled to the LAN/WAN/Internet 20.

The wearable computing device 12 is illustrated as a wrist watch, but can also be a bracelet, a piece of jewelry, or any other object otherwise carried by, or attached to, the user 14. The wearable computing device 12 includes a communication interface 24 that provides an application programming interface (API) for communicating with other computing devices via a communications network. In one embodiment, the wearable computing device 12 uses the communication interface 24 to communicate directly with the PAN 18, and with the personal computing device 16 via the PAN 18. The communication interface 24 can receive instructions corresponding to inputs from the user 14 and provide messages via the PAN 18 to the personal computing device 16, and to one or more of the computing devices 22 via the PAN 18, the personal computing device 16, and the LAN/WAN/Internet 20. In one embodiment (not shown), the wearable computing device 12 uses the communication interface 24 to communicate directly with the LAN/WAN/Internet 20, and with one or more of the computing devices 22 via the LAN/WAN/Internet 20, instead of via the PAN 18.

The wearable computing device 12 further includes a processor 26, coupled to the communication interface 24, for executing instructions according to the functionality of the wearable computing device 12. The wearable computing device 12 further includes a memory 28, for storing, for example, the instructions according to the functionality of the wearable computing device 12, and associated values.

The wearable computing device 12 further includes a display 30, coupled to the processor 26, for presenting information to the user 14 regarding the functionality of the wearable computing device 12. The wearable computing device 12 may further include other presentation elements 32 for presenting information to the user 14, such as a light emitting diode (LED), a speaker, and a vibration module. As a non-limiting example, the wearable computing device 12 can be in the form of a watch, and the display 30 can present to the user 14 a time representation during an active watch mode or a blank screen during a power-save mode.

The wearable computing device 12 further includes one or more input elements for receiving inputs from the user 14. As a non-limiting example, the wearable computing device 12 can be in the form of a watch, and the display 30 can include touch-screen functionality to accept an input from the user 14 by sensing a touch on the display 30. The wearable computing device 12 can also include an audio sensor 34, coupled to the processor 26, to receive input in the form of speech. In particular, the processor 26 can be configured with speech processing capabilities to translate speech received through the audio sensor 34 into input commands for the wearable computing device 12. The wearable computing device 12 may further include other input elements 35, such as a camera, a push-button, a rotary knob, etc.

With continued reference to FIG. 1, the wearable computing device 12 is communicatively coupled to the personal computing device 16 via the PAN 18 to exchange messages regarding the functionality of the wearable computing device 12. The PAN 18 is a communication network for data transmission among devices such as, for example, smartphones, tablet computers, personal computers, and wearable computing devices. The PAN 18 can be a wired or wireless network. Non-limiting examples of PAN technology standards include Bluetooth™, Universal Serial Bus (USB), Infrared Data Association (IrDA), Wireless Fidelity (Wi-Fi™), etc. In one embodiment, the wearable computing device 12 can be in the form of a watch with message notification functionality. The personal computing device 16 can send notifications to the wearable computing device 12 via the PAN 18 when the personal computing device 16 receives a message from, for example, one of the computing devices 22 via the LAN/WAN/Internet 20. In one embodiment (not shown), the wearable computing device 12 is communicatively coupled to one of the computing devices 22 via the LAN/WAN/Internet 20, and not via the PAN 18, and therefore, one of the computing devices 22 may send notifications and/or messages to the wearable computing device 12 via the LAN/WAN/Internet 20 directly instead of via the PAN 18.

With continued reference to FIG. 1, the personal computing device 16 can communicate with computing devices 22 via the LAN/WAN/Internet 20. The personal computing device 16 may be embodied as, for example, a smartphone, a tablet computer, or a personal computer. The personal computing device 16 may include a wearable computing device interface 36 for facilitating communications with the wearable computing device 12. In one embodiment, the wearable computing device interface 36 may comprise an API for communicating with the wearable computing device 12 via the PAN 18. The personal computing device 16 may also include a LAN/WAN/Internet communication interface 38 for facilitating communications with the LAN/WAN/Internet 20. In one embodiment, the LAN/WAN/Internet communication interface 38 may comprise an API for communicating with the computing devices 22 via the LAN/WAN/Internet 20. The LAN/WAN/Internet 20 can be a wired or wireless network. Non-limiting examples of LAN/WAN/Internet technology standards include Ethernet, Wi- Fi™, Point-to-Point Protocol (PPP), Integrated Services Digital Network (ISDN), Frame Relay, Asynchronous Transfer Mode (ATM), Digital Subscriber Line (DSL), Global System for Mobile Communications (GSM), Code Division Multiple Access (CDMA) Mobile Communications, Universal Mobile Telecommunications System (UMTS), and 4G Long-Term Evolution (4G LTE).

The personal computing device 16 may also include a personal presentation interface 40 for providing information to a corresponding user, such as the user 14. The personal presentation interface 40 may include, for example, a display, a light-emitting diode (LED), a speaker, or a vibration module. As a non-limiting example, the personal computing device 16 can be in the form of a smartphone, and the personal presentation interface 40 may include a display, a speaker, and a microphone to facilitate communication between the user 14 and, for example, one of the computing devices 22 via the LAN/WAN/Internet 20.

In one example, the user 14 may be in an emergency situation that may worsen if a corresponding perpetrator detects that the user 14 is placing a call for emergency assistance using the personal computing device 16, for example a smartphone, or using the wearable computing device 12, for example a watch. In one embodiment, the user 14 can use the wearable computing device 12 to send a covert assistance request message in a covert manner.

Figure 2:
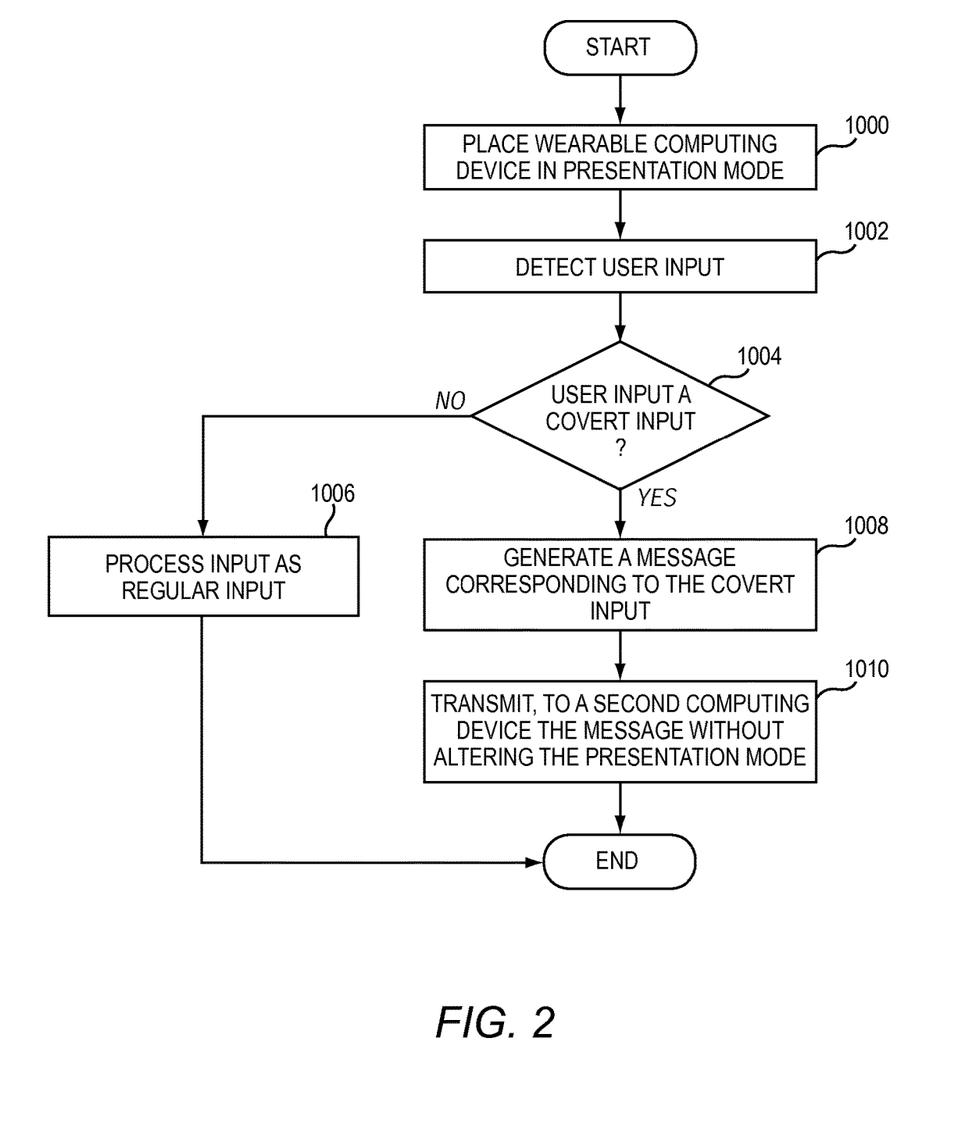
FIG. 2 is a flowchart of a method for sending a message according to one embodiment.

In this regard, FIG. 2 is a flowchart of a method for sending a message according to one embodiment. FIG. 2 will be discussed in conjunction with FIG. 1. At block 1000, the wearable computing device 12 places the wearable computing device 12 in a presentation mode, in which the wearable computing device 12 configures a presentation interface therein, for example the display 30, based on a current functionality. As a non-limiting example, for a wearable computing device 12 that is in the form of a watch, an active watch presentation mode may provide a representation of time. The display 30 may be updated every second or every minute. However, such "update" is part of the presentation of time of the active watch presentation mode, not an alteration of the active watch presentation mode. As a further example, a power-save presentation mode may simply provide a blank screen on the display 30, if the watch is set to reduced power operation. Both of these examples constitute a valid presentation mode for the wearable computing device 12.

With continued reference to FIG. 2, at block 1002, the wearable computing device 12 detects a user input via an input interface. As a non-limiting example, the wearable computing device 12 may be in the form of a watch; the display 30 may be a touch-screen display; and detecting the user input may include detecting a touch on the touch-screen display. At block 1004, as a non-limiting example, the wearable computing device 12 may determine that the user input is a covert input if the touch on the touch-screen display exceeds a predetermined period of time. A value corresponding to the predetermined amount of time may be a default amount of time or a user-configured amount of time, and may be stored in the memory 28. As another non-limiting example, the wearable computing device 12 may include a microphone, and the processor 26 may include speech processing capabilities and be capable of determining if an audible input matches a pre-recorded audible phrase. The pre-recorded audible phrase may be a default audible phrase or a user-configured audible phrase, and may be stored in the memory 28. At block 1004, as a non-limiting example, the processor 26 may determine that the user input is a covert input if the audible input corresponds to the pre-recorded audible phrase stored in the memory 28. As another non-limiting example, the wearable computing device 12 may be in the form of a watch and include both the touch-screen display and the microphone described with respect to the non-limiting examples described above. In this non-limiting example, at block 1004, the wearable computing device 12 may determine that the user input is a covert input if a touch on the touch-screen display exceeds the predetermined period of time and if an audible input corresponds to the pre-recorded audible phrase stored in the memory 28. Thus, a covert input may be a predetermined input, a user-configured input, a predetermined combination of inputs, or a user-configured combination of inputs.

If the wearable computing device 12 determines that the user input is not a covert input, at block 1006, the wearable computing device 12 processes the input as a regular input according to the regular functionality of the wearable computing device 12. For example, the wearable computing device 12 may be in the form of a watch; the display 30 may be a touch-screen display; and detecting the user input may include detecting a touch on the touch-screen display 30. If the touch on the touch-screen display 30 does not exceed a predetermined period of time, the wearable computing device 12 simply processes the input as it regularly would. For example, the touch may cause the wearable computing device 12 to the present to the user 14 a weather forecast of a pending message.

If the wearable computing device 12 determines that the user input is a covert input, at block 1008, the wearable computing device 12 generates a first message corresponding to the covert input. In particular, after the wearable computing device 12 determines that the user input is a covert input, the wearable computing device 12 uses the covert input to retrieve from the memory 28 a message corresponding to the covert input. The memory 28 may include a plurality of entries corresponding to a plurality of covert inputs, and each entry may include a corresponding message that may be sent by the wearable computing device 12 when the corresponding covert input occurs. The message may include, for example, a call for help to a law enforcement entity, a call for help to a close friend, neighbor, or the like. At block 1010, the wearable computing device 12 then transmits the message to a corresponding recipient without altering the presentation mode. The corresponding recipient may be included in the entry of the corresponding covert input in the memory 28.

Although reception of only one covert input is illustrated, more than one covert input may be received by the wearable computing device 12. A second covert input may cause the wearable computing device 12 to transmit a second message to a second recipient. One or both of the second message and the second recipient may differ from the first message and the first recipient. In particular, the wearable computing device may detect a second user input, determine that the second user input is a second covert input, generate a second message corresponding to the second covert input, and transmit, to a second recipient the second message without altering the presentation mode.

Transmitting the message to a corresponding recipient without altering the presentation mode relates to maintaining the appearance corresponding to the functionality of the wearable computing device 12 for those around the wearable computing device 12. By way of non-limiting examples, for a wearable computing device 12 in the form of a watch, including a display 30, the display 30 continues to present a digital representation of time, if in active watch presentation mode, or continues to present a blank screen, if in a power-save presentation mode, during transmission of the message. Furthermore, any other presentation element, such as an LED or a speaker, maintains its corresponding presentation mode so as to not indicate to a nearby person that a message is being transmitted.

Figure 3A:
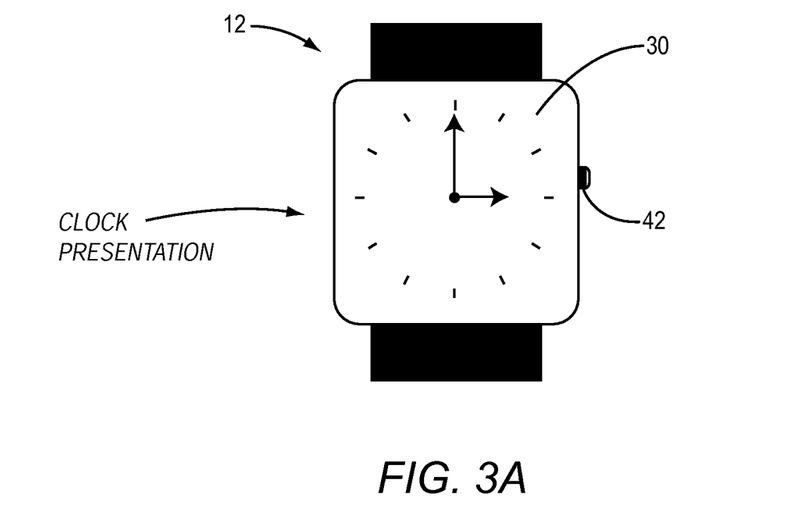
FIG. 3A illustrates a presentation mode of a wearable computing device in which information is presented in a display according to one embodiment.
Figure 3B:
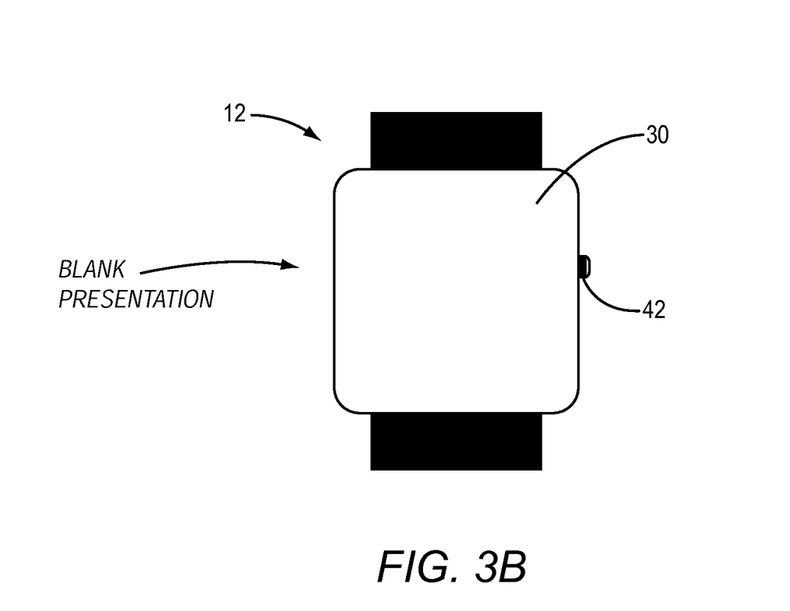
FIG. 3B illustrates another presentation mode of a wearable computing device in which information is presented in a display according to one embodiment.

In this regard, FIGS. 3A and 3B illustrate examples of a presentation mode for the wearable computing device 12 in the form of a watch, according to one embodiment. FIGS. 3A and 3B will be discussed in conjunction with FIG. 1. In one embodiment, the display 30 of the wearable computing device 12 is a touch-screen display that presents information associated with features of a watch and also receives touch input from the user 14. The wearable computing device 12 further includes an input element in the form of a push-button 42, which may be used to enter commands into the wearable computing device 12.

FIG. 3A illustrates an active watch presentation mode of the wearable computing device 12 in which information is presented on the display 30 according to one embodiment. In the embodiment, the information presented is a representation of time in the form of an analog clock. The representation of time may also be in the form of a digital clock. FIG. 3B illustrates a power-save presentation mode of the wearable computing device 12 in which information is presented on the display 30 according to one embodiment. In the embodiment, the information presented is a blank screen, presented when, for example, the wearable computing device 12 enters a power-save presentation mode.

When the wearable computing device 12 detects a covert input, and thus, determines that a corresponding message will be transmitted, the transmission of the message does not alter the presentation mode. Specifically, when the wearable computing device 12 is in active watch presentation mode, as illustrated in FIG. 3A, the display 30 continues to present the representation of time during transmission of the message, and will not provide to the user 14 any indication that the message will be, is being, or has been sent. When the wearable computing device 12 is in a power-save presentation mode, as illustrated in FIG. 3B, the display 30 continues to present a blank screen during transmission of the message, and will not provide to the user 14 any indication that the message will be, is being, or has been sent. In both cases, the other presentation elements 32, such as an LED or a speaker, will maintain their corresponding presentation mode so as to not indicate to a nearby person that a message is being transmitted.

Furthermore, when the wearable computing device 12 transmits such a covert message to one of the computing devices 22 via the PAN 18 and the personal computing device 16, as illustrated in FIG. 1, at least the personal computing device 16 is also configured to not alter its presentation mode. Specifically, as noted above, the personal computing device 16 includes a personal presentation interface 40 for providing information to a corresponding user. When the personal computing device 16 receives the covert message, the personal computing device 16 identifies the message as a covert message and does not provide any indication through the personal presentation interface 40 that the message will be, is being, or has been sent.

Figure 4:
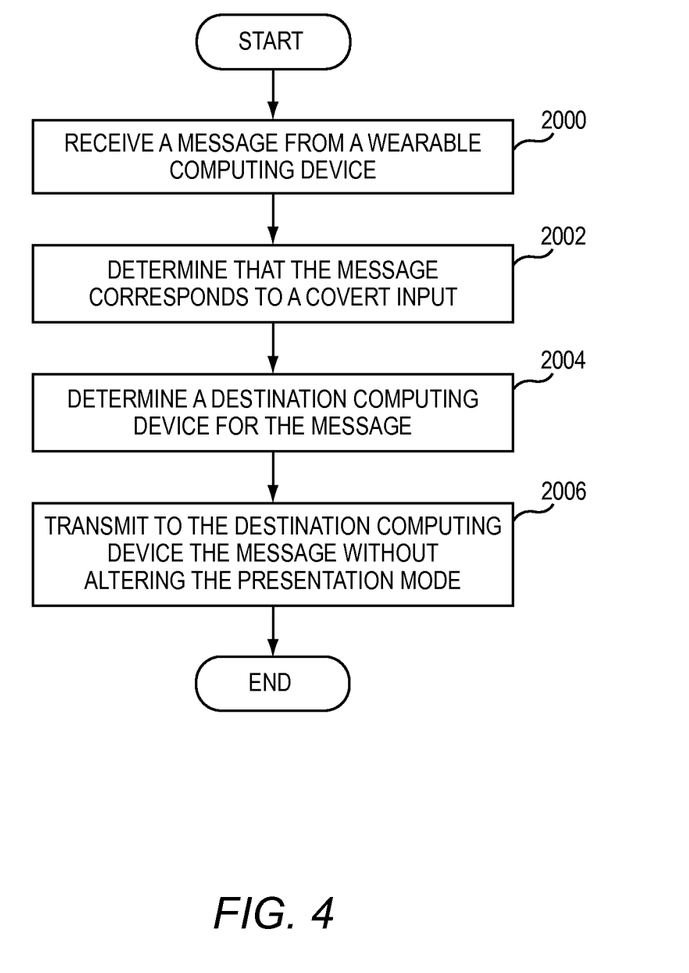
FIG. 4 is a flowchart of a method for receiving a message according to one embodiment.

In this regard, FIG. 4 is a flowchart of a method for receiving a message according to one embodiment. FIG. 4 will be discussed in conjunction with FIG. 1. At block 2000, the personal computing device 16 receives from the wearable computing device 12 a message. At block 2002, the personal computing device 16 determines that the message corresponds to a covert input. At block 2004, the personal computing device 16 determines a destination computing device for the message from the information in the message. At block 2006, the personal computing device 16 transmits to the destination computing device the message without altering a personal computing device presentation mode. As a non-limiting example, for a personal computing device 16 that is in the form of a smartphone, an active phone presentation mode may provide a date, a time, and various icons configured by the user 14 as preferred icons on a corresponding display (not shown). As a further example, an idle phone presentation mode may simply provide a blank screen on the corresponding display, if the phone is idle and set to reduced power operation. Both of these examples constitute a valid presentation mode for the personal computing device 16. It is noted that the personal computing device 16 may receive further messages from the wearable computing device 12, each of the messages corresponding to a particular covert input and addressed to a particular destination computing device.

Thus, if the user 14 is under an emergency situation, which may worsen if a corresponding perpetrator detects a call for assistance, he or she can use the wearable computing device 12, independently or in combination with the personal computing device 16, to send a covert assistance request message in a covert manner.

Figure 5A:
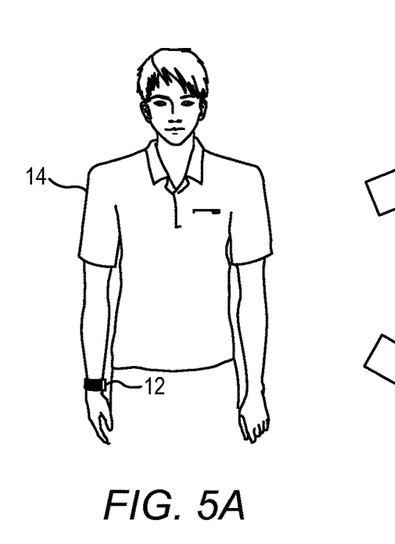
FIGS. 5A, 5B, and 5C illustrate a user entering a covert input into a wearable computing device according to one embodiment.
Figure 5B:
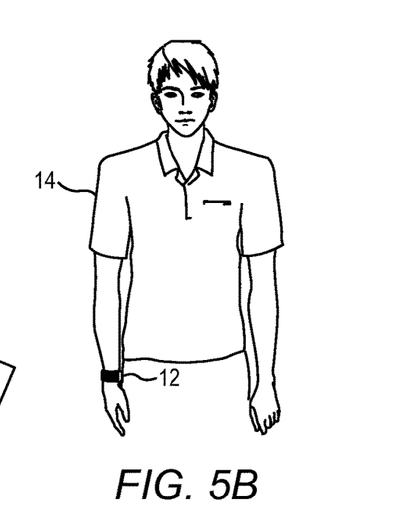
Figure 5C:
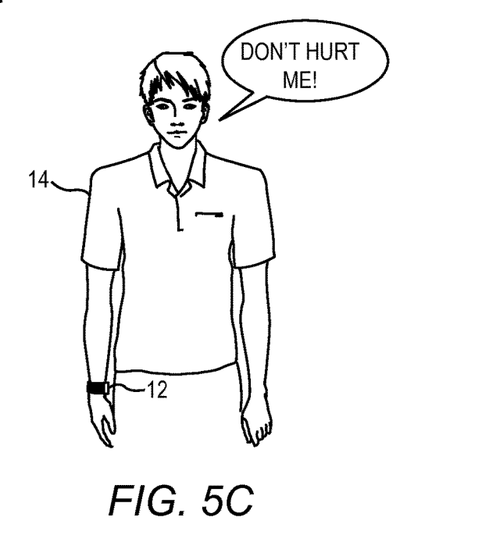

In this regard, FIGS. 5A, 5B, and 5C illustrate the user 14 entering a covert input into the wearable computing device 12 according to one embodiment. FIGS. 5A, 5B, and 5C will be discussed in conjunction with FIG. 1. In FIGS. 5A, 5B, and 5C, the user 14 is wearing a wearable computing device 12 in the form of a watch on his wrist. In this embodiment, the user 14 may enter a covert input in multiple ways. In a non-limiting example, the user 14 can enter a covert input by touching the touch-screen display 30 of the wearable computing device 12 against a body part, such as a thigh or hip, as illustrated in FIG. 5B. The wearable computing device 12 detects the touch on the touch-screen display 30 and, if the touch is held for a predetermined period of time, the wearable computing device 12 determines that the input is a covert input. In response, the wearable computing device 12 transmits a corresponding message without altering a current presentation mode.

In another non-limiting example, the user 14 can enter a covert input by providing a predetermined audible phrase. The processor 26 of the wearable computing device 12 processes the audible phrase and determines that the audible phrase corresponds to a predetermined phrase corresponding to a covert input. In response, the wearable computing device 12 transmits a corresponding message without altering a current presentation mode. FIG. 5C illustrates the spoken phrase as "Don't hurt me," which may correspond in the memory 28 to a message to be sent to a law enforcement entity. Other phrases may cause the wearable computing device 12 to send respective messages to other entities. For example, the phrase "get out of my house" may cause the wearable computing device 12 to send a message to a law enforcement entity and to a neighbor who may be able to reach the user's home, and assist the user, before the law enforcement entity is able to do so. Those skilled in the art will recognize that the present embodiment may include other ways to detect a covert input, and that other embodiments according to the present disclosure may include the above-noted non-limiting example convert inputs and/or other example covert inputs.

Figure 6:
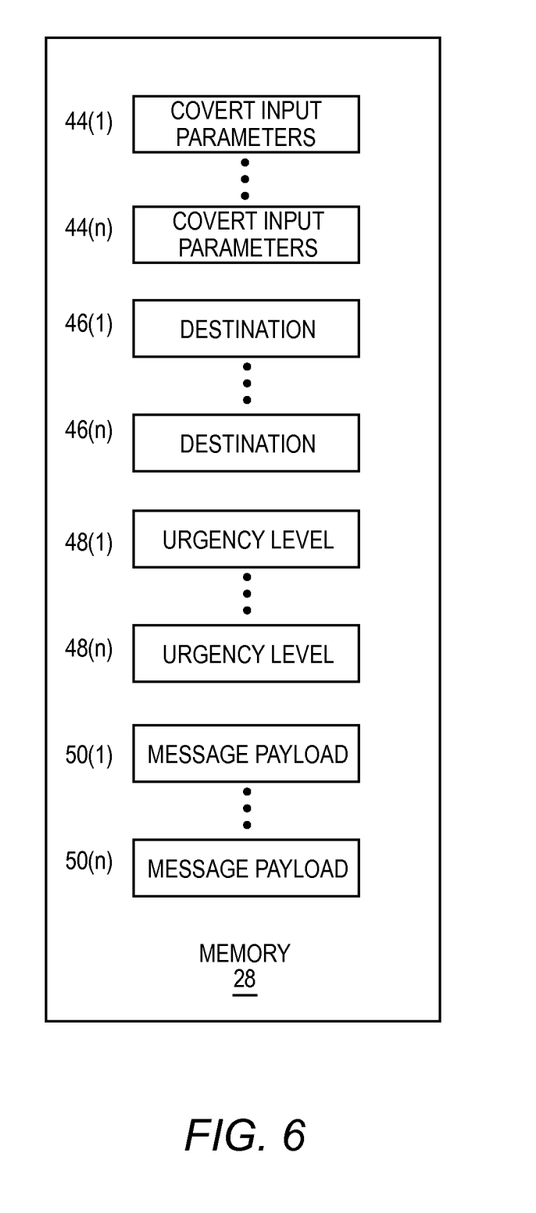
FIG. 6 illustrates a structure of a memory according to one embodiment.

FIG. 6 illustrates a structure of the memory 28 according to one embodiment. The memory 28 includes a plurality of values that the wearable computing device 12 may use to, for example, determine if an input from the user 14 is a covert input and generate an assistance request message corresponding to a received covert input. In particular, the memory 28 includes a plurality of covert input parameters 44(1)-44(*n*), a plurality of destinations 46(1)-46(*n*) corresponding to the plurality of covert input parameters 44(1)-44(*n*), a plurality of urgency levels 48(1)-48(*n*) corresponding to the plurality of covert input parameters 44(1)-44(*n*), and a plurality of message payloads 50(1)-50(*n*) corresponding to the plurality of covert input parameters 44(1)-44(*n*). These values will be explained in further detail with reference to FIG. 7 below.

Figure 7:
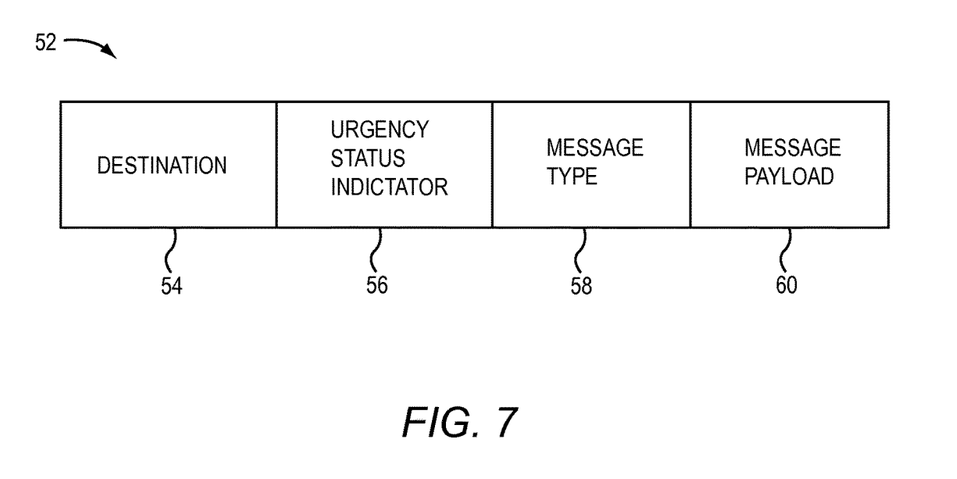
FIG. 7 illustrates a format of an assistance request message according to one embodiment.

FIG. 7 illustrates a format of an assistance request message 52 according to one embodiment. FIG. 7 will be discussed in conjunction with FIG. 1. The assistance request message 52 includes a destination 54, an urgency status indicator 56, a message type 58, and a message payload 60. The destination 54 includes the destination of the assistance request message 52. For example, the destination 54 may be a law enforcement entity, a fire department, a doctor, a friend, a neighbor, etc. The destination 54 may be a value for a phone number, an emergency system designator, an internet address, a text message address, an email address, etc. Upon determining that a covert input has been received, the processor 26 accesses the memory 28 to determine the destination information of the assistance request message 52 and adds the destination information as the destination 54.

The assistance request message 52 further includes the urgency status indicator 56, which comprises an urgency value corresponding to the covert input. The urgency value is representative of an urgency level of the assistance request message 52. This may allow a recipient to prioritize the use of resources. Furthermore, more than one covert input may be received by the wearable computing device 12. A second covert input may cause the wearable computing device 12 to transmit a second assistance request message 52 to a second destination 54, and include a second urgency level in a second urgency status indicator 56. The second urgency level for the second urgency status indicator 56 may differ from the first urgency level of the first urgency status indicator 56. In particular, the wearable computing device 12 may detect a second user input, determine that the second user input is a second covert input, generate the second assistance request message 52 corresponding to the second covert input, including the second destination 54 and the second urgency level in a second urgency status indicator 56, and transmit, to the second destination 54 the second assistance request message 52.

The assistance request message 52 further includes a message type 58, which comprises a type value corresponding to the message payload 60 of the assistance request message 52. In some cases, the covert input may cause the wearable computing device 12 to provide predetermined text corresponding to the underlying emergency. For example, if the destination 54 is a computer system of a law enforcement agency, then the type of information in the assistance request message 52 may be better provided as plain text; whereas if the destination 54 is a phone, and if the assistance request message 52 is sent as a telephone call, then the information in the assistance request message 52 may be better provided as pre-recorded or generated digital audio that the recipient can listen to on the destination phone.

The assistance request message 52 further includes a message payload 60, which comprises the information the user 14 wishes to provide to the corresponding destination 54. For example, if the destination 54 is a computer system of a law enforcement agency, the information in the assistance request message 52 may be better provided as plain text, whereas if the destination is a phone, and if the message is sent as a telephone call, then the information may be better provided as pre-recorded or generated digital audio that the recipient can listen to on the destination phone.

A recipient of the assistance request message 52 may wish to know more about the emergency situation being reported by the user 14. However, after considering the information provided by the user 14 in the assistance request message 52, the recipient may realize that he or she cannot simply call the user 14 because it may worsen the emergency situation.

Figure 8:
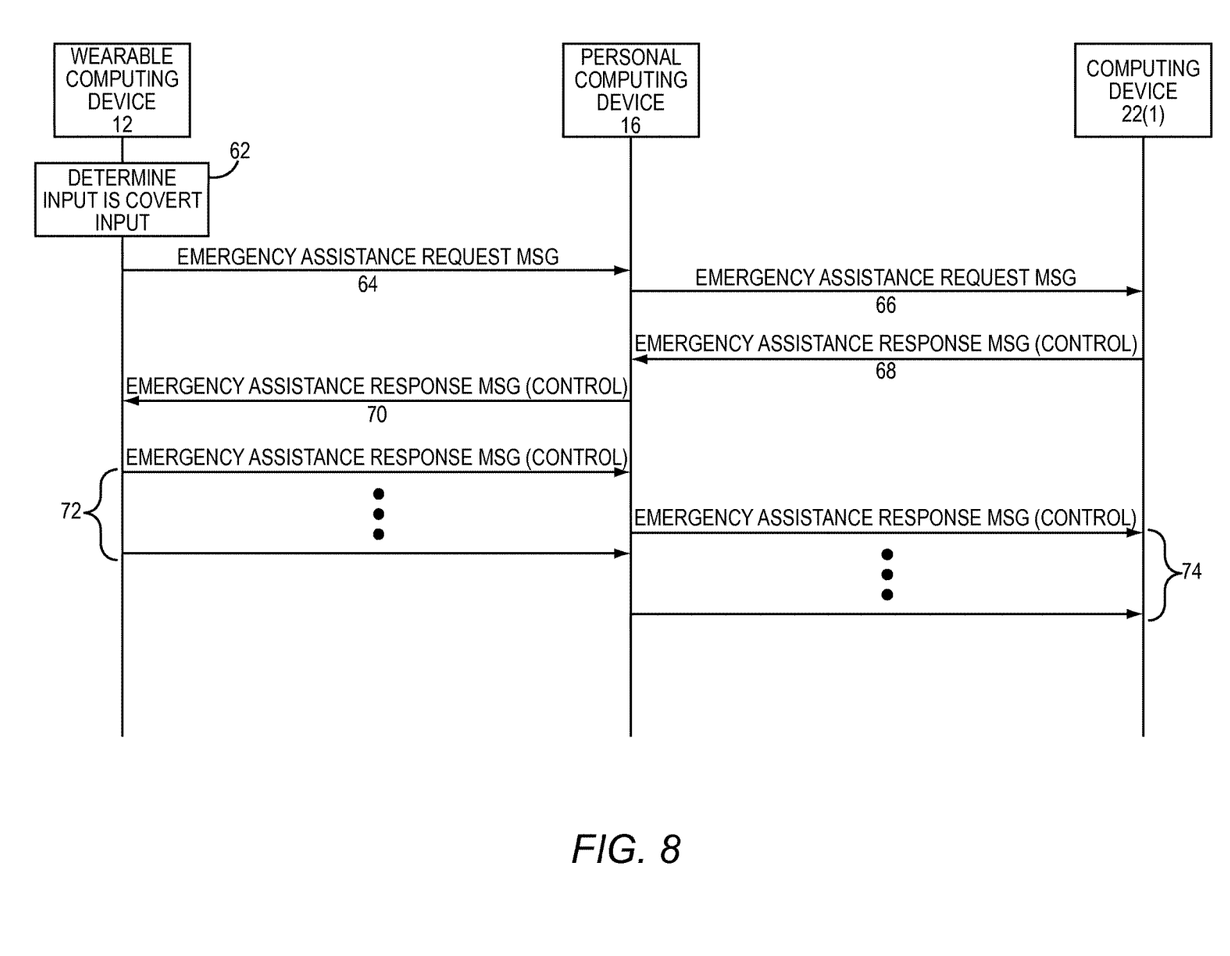
FIG. 8 is a message flow diagram illustrating an example flow of communications in the system according to one embodiment.

In that regard, FIG. 8 provides a message flow diagram according to one embodiment. FIG. 8 will be discussed in conjunction with FIG. 1. At step 62, the wearable computing device 12 determines that an input received from the user 14 is a covert input. At step 64, the wearable computing device 12 sends an assistance request message 52 to the personal computing device 16. At step 66, the personal computing device 16 sends the assistance request message 52 to the computing device 22(1) identified as an emergency contact corresponding to the covert input, as set forth in the destination 54 of the assistance request message 52. The computing device 22(1) may wish to know more about the emergency situation being reported by the user 14 and, at step 68, sends an emergency assistance response message to the personal computing device 16, and at step 70, the personal computing device 16 forwards the emergency assistance response message to the wearable computing device 12. The emergency assistance response message includes a control field that includes a command to enable a feature of the wearable computing device 12 and return associated information to the computing device 22(1). For example, the control field may command the wearable computing device 12 to activate the audio sensor 34 to record audio and transmit a second message including the recorded audio to the computing device 22(1). As another example, the computing device 22(1) may determine that emitting a sound may be appropriate, and send a message including a control command to activate the audio generator to emit audio corresponding to the first response message, and digitized voice for the audio to be emitted. As yet another example, the computing device 22(1) may command the wearable computing device 12 or the personal computing device 16 to provide a visual feedback to, for example, indicate to the user 14 that the covert message has been received. As yet another example, the control field may command the wearable computing device 12 or the personal computing device 16 to activate a location unit to determine a geographical location of the wearable computing device 12 or the personal computing device 16 and transmit a second message including the geographical location to the computing device 22(1).

At step 72, the wearable computing device 12 sends at least one emergency assistance response message to the personal computing device 16, including the information requested by the computing device 22(1). As non-limiting examples, the information may include captured audio, and may be transmitted in a stream format using a plurality of emergency assistance response messages, or may be transmitted as a continuous stream of real-time media. At step 74, the personal computing device 16 forwards the emergency assistance response message(s) to the computing device 22(1).

Figure 9:
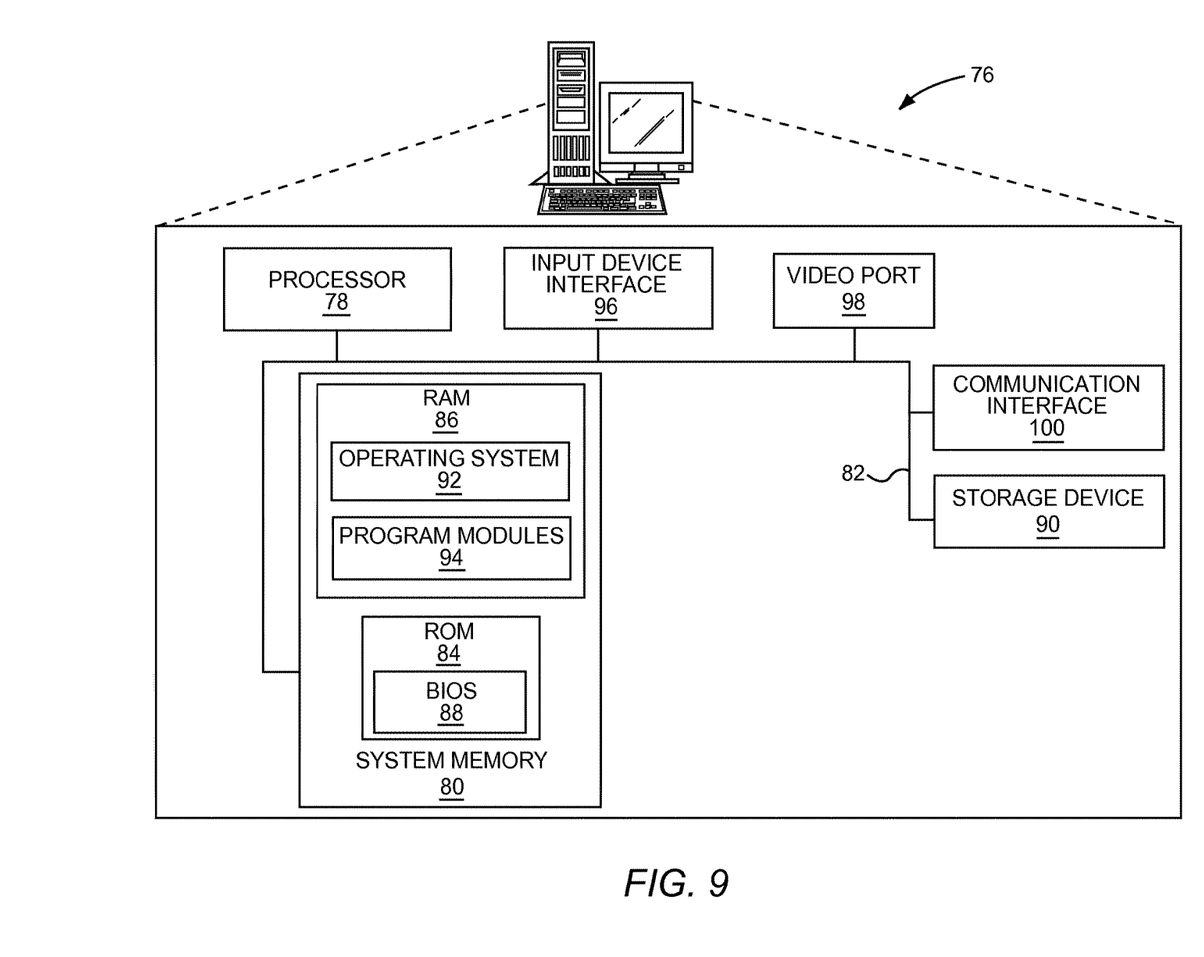
FIG. 9 is a block diagram of a computing device according to one embodiment.

FIG. 9 is a block diagram of an exemplary computing device 76 in which embodiments disclosed herein may be implemented. The embodiments have been described as directed to a wearable device. However, embodiments may include other computing devices, such as the computing device 76, and may comprise, for example: a laptop computer, a desktop computer, a personal digital assistant (PDA), a workstation, a server, or any other computing device comprising a processor and capable of processing both data and suitable instructions to carry out the functionality described herein. The computing device 76 may include a processor, such as a processor 78, a system memory 80, and a system bus 82. The system bus 82 provides an interface for system components including, but not limited to, the system memory 80 and the processor 78. The processor 78 can be any of various commercially available or proprietary processors. Dual microprocessors and other multi-processor architectures may also be employed as the processor 78.

The system bus 82 may be any of several types of bus structures that may further interconnect to a memory bus (with or without a memory controller), a peripheral bus, and/or a local bus using any of a variety of commercially available bus architectures. The system memory 80 may include non-volatile memory 84 (e.g., read only memory (ROM), erasable programmable read only memory (EPROM), electrically erasable programmable read only memory (EEPROM), etc.) and/or volatile memory 86 (e.g., random access memory (RAM)). A basic input/output system (BIOS) 88 may be stored in the non-volatile memory 84, and can include the basic routines that help to transfer information between elements within the computing device 76. The volatile memory 86 may also include a high-speed RAM, such as static RAM, for caching data.

The computing device 76 may further include a storage device 90, which may comprise, for example, an internal hard disk drive (HDD) (e.g., enhanced integrated drive electronics (EIDE) or serial advanced technology attachment (SATA)) for storage, flash memory, or the like. The storage device 90 and associated computer-readable and computer-usable media provide non-volatile storage of data, data structures, computer-executable instructions, and so forth, such as the wearable computing device 12 and the personal computing device 16 illustrated in FIG. 1 and described above. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

A number of program modules can be stored in the storage device 90 and in the volatile memory 86, including an operating system 92 and one or more program modules 94, which may implement the functionality described herein in whole or in part, including, for example, functionality associated with the wearable computing device 12 and the personal computing device 16 illustrated in FIG. 1 and described above. It is to be appreciated that the embodiments can be implemented with various commercially available operating systems 92 or combinations of operating systems 92.

All or a portion of the embodiments may be implemented as a computer program product, such as a non-transitory computer-usable or computer-readable medium having a computer-readable program code embodied therein. The computer-readable program code can include complex software instructions for implementing the functionality of the embodiments described herein when executed on the processor 78. The processor 78, in conjunction with the program modules 94 in the volatile memory 86, may serve as a controller, or control system, for the computing device 76 that is configured to, or adapted to, implement the functionality described herein.

An administrator may be able to enter commands and information into the computing device 76 through one or more input devices, such as, for example, a touch-sensitive display (not illustrated), a keyboard (not illustrated), or a pointing device, such as a mouse (not illustrated). Other input devices (not illustrated) may include a microphone, an infrared (IR) remote control, a joystick, a game pad, a stylus pen, or the like. These and other input devices are often connected to the processor 78 through an input device interface 96 that is coupled to the system bus 82, but can be connected by other interfaces such as a parallel port, an IEEE 1394 serial port, a game port, a universal serial bus (USB) port, an IR interface, etc.

The computing device 76 may drive a separate or integral display device (not shown), which may also be connected to the system bus 82 via an interface, such as a video port 98. The computing device 76 preferably includes a communication interface 100 that is configured to communicate with a network, such as the LAN/WAN/Internet 20 and the PAN 18 illustrated in FIG. 1.

Those skilled in the art will recognize improvements and modifications to the preferred embodiments of the disclosure. All such improvements and modifications are considered within the scope of the concepts disclosed herein and the claims that follow.

What is claimed is:

1. A method for sending a message comprising:

placing, by a processor of a wearable computing device, a display of the wearable computing device in a presentation mode of a plurality of different presentation modes related to operation of the wearable computing device, wherein the wearable computing device comprises a touch-screen display, the processor is configured to operate as a watch;

detecting, by the processor of the wearable computing device, a first user input;

determining, by the processor of the wearable computing device, that the first user input is a first covert input of a first type of a plurality of covert input types, wherein determining that the first user input is the first covert input of the first type of the plurality of covert input types comprises detecting a first touch of a first type on the touch-screen display for a predetermined period of time;

in response to determining that the first user input is of the first type, generating, by the processor of the wearable computing device, a first message corresponding to the first covert input, wherein generating the first message comprises adding an urgency status indicator and destination information corresponding to the first covert input, and wherein the urgency status indicator and destination information of the first message are determined based on the first user input being of the first type;

transmitting, by the processor of the wearable computing device, to a first personal computing device, the first message without altering the presentation mode of the display of the wearable computing device, wherein the first personal computing device comprises a display in a presentation mode of a plurality of different presentation modes related to operation of the personal computing device and wherein the first message does not cause the presentation mode of the personal computing device to change;

detecting, by the processor of the wearable computing device, a second user input;

determining, by the processor of the wearable computing device, that the second user input is a second covert input of a second type of the plurality of covert input types, wherein determining that the second user input is the second covert input of the second type of the plurality of covert input types comprises detecting a second touch of a second type on the touch-screen display for a predetermined period of time and wherein the second type of the second covert input is different from the first type of the first covert input;

in response to determining that the second user input is of the second type, generating, by the processor of the wearable computing device, a second message corresponding to the second covert input, wherein generating the second message comprises adding an urgency status indicator and destination information corresponding to the second covert input, and wherein the urgency status indicator and destination information of the second message are determined based on the second user input being of the second type and are different from the urgency status indicator and destination information of the first message;

transmitting, by the processor of the wearable computing device, to the first computing device, the second message without altering the presentation mode of the display of the wearable computing device, wherein the second message does not cause the presentation mode of the first personal computing device to change;

receiving, from the first personal computing device, a first response message received by the first personal computing device in response to the first message and originating from a system associated with the destination information of the first message, the first response message comprising a control field including a command to enable a feature of the wearable computing device; and enabling the feature of the wearable computing device based on the command in the control field of the first response message.

2. The method of claim 1, wherein the wearable computing device comprises an audio sensor and determining that the first user input is the first covert input of the first type of the plurality of covert input types further comprises:
detecting an audible phrase;
comparing the audible phrase to at least one predetermined audible phrase; and
determining that the audible phrase corresponds to a predetermined audible phrase of the at least one predetermined audible phrase.

3. The method of claim 1, wherein the presentation mode comprises presenting in the display a time representation when in an active watch presentation mode.

4. The method of claim 1, wherein the presentation mode comprises presenting in the display a blank screen when in a power-save presentation mode.

5. The method of claim 1, wherein the first message causes the first personal computing device to transmit the first message to a second personal computing device and wherein the second personal computing device is determined based on the first type of the plurality of covert input types wherein generating the first message comprises adding destination information corresponding to the second personal computing device.

6. The method of claim 5, wherein the destination information corresponding to the second personal computing device comprises one of a phone number, an emergency system designator, an interne address, a text message address, and an email address.

7. The method of claim 5, wherein the second computing device is determined based on the second type of the plurality of covert input types, wherein generating the second message comprises adding destination information corresponding to the second computing device.

8. The method of claim 1, wherein the first type of the plurality of covert input types comprises a touch input, and wherein the second type of the plurality of covert input types comprises a predetermined audible phrase input.

9. The method of claim 1, wherein the first message further comprises pre-recorded or generated digitized audio.

10. The method of claim 1, wherein the feature comprises at least one of an audio sensor, an audio generator, a display indication, and a location unit.

11. The method of claim 1, wherein the feature is an audio sensor and enabling the audio sensor comprises:
activating the audio sensor to record audio; and
transmitting a second message to the first personal computing device comprising information representative of the recorded audio.

12. The method of claim 1, wherein the feature is an audio sensor and enabling the audio sensor comprises:
activating the audio sensor to record audio; and
transmitting a third message to the first personal computing device comprising information representative of the recorded audio as a continuous stream of real-time media.

13. The method of claim 1, wherein the feature is an audio generator and enabling the audio generator comprises:
activating the audio generator; and
emitting audio corresponding to the first response message.

14. The method of claim 13, wherein the audio corresponding to the first response message comprises digitized voice.

15. The method of claim 1, wherein the feature is a location unit and enabling the location unit comprises:
activating the location unit to determine a geographical location of the wearable computing device; and
transmitting a third message to the first personal computing device comprising the geographical location.

16. A wearable computing device comprising:
a communication interface configured to communicate with a first personal computing device; and
a processor, coupled to the communication interface, configured to:
place a display of the wearable computing device in a presentation mode of a plurality of different presentation modes related to operation of the wearable computing device, wherein the wearable computing device comprises a touch-screen display, the processor is configured to operate as a watch;
detect a first user input;
determine that the first user input is a first covert input of a first type of a plurality of covert input types, wherein determining that the first user input is the first covert input of the first type of the plurality of covert input types comprises detecting a first touch of a first type on the touch-screen display for a predetermined period of time;

in response to determining that the first user input is of the first type, generate a first message corresponding to the first covert input, wherein generating the first message comprises adding an urgency status indicator and destination information corresponding to the first covert input, and wherein the urgency status indicator and destination information of the first message are determined based on the first user input being of the first type;

transmit, to the first personal computing device, the first message without altering the presentation mode of the display of the wearable computing device, wherein the first personal computing device comprises a display in a presentation mode of a plurality of different presentation modes related to operation of the personal computing device and wherein the first message does not cause the presentation mode of the personal computing device to change;

detect a second user input;

determine that the second user input is a second covert input of a second type of the plurality of covert input types, wherein determining that the second user input is the second covert input of the second type of the plurality of covert input types comprises detecting a second touch of a second type on the touch-screen display for a predetermined period of time and wherein the second type of the second covert input is different from the first type of the first covert input;

in response to determining that the second user input is of the second type, generate a second message corresponding to the second covert input, wherein generating the second message comprises adding an urgency status indicator and destination information corresponding to the second covert input, and wherein the urgency status indicator and destination information of the second message are determined based on the second user input being of the second type and are different from the urgency status indicator and destination information of the first message;

transmit, to the first computing device, the second message without altering the presentation mode of the display of the wearable computing device, wherein the second message does not cause the presentation mode of the first personal computing device to change;

receive, from the first personal computing device, a first response message received by the first personal computing device in response to the first message and originating from a system associated with the destination information of the first message, the first response message comprising a control field including a command to enable a feature of the wearable computing device; and enable the feature of the wearable computing device based on the command in the control field of the first response message.

17. The wearable computing device of claim 16, wherein the wearable computing device is configured as a watch, and the presentation mode comprises presenting in the display a blank screen when in a power-save presentation mode.

18. A computer program product for sending a message in a wearable computing device, the computer program product stored on a non-transitory computer-readable storage medium and including instructions configured to cause a processor of the wearable computing device to carry out the steps of:

placing a display of the wearable computing device in a presentation mode of a plurality of different presentation modes related to operation of the wearable computing device, wherein the wearable computing device comprises a touch-screen display, the processor is configured to operate as a watch;

detecting a user input;

determining that the user input is a covert input of a first type of a plurality of covert input types, wherein determining that the first user input is the first covert input of the first type of the plurality of covert input types comprises detecting a first touch of a first type on the touch-screen display for a predetermined period of time;

in response to determining that the first user input is of the first type, generating a message corresponding to the covert input wherein generating the first message comprises adding an urgency status indicator and destination information corresponding to the first covert input, wherein the urgency status indicator and destination information of the first message are determined based on the first user input being of the first type;

transmitting, to a first personal computing device, the message without altering the presentation mode of the display of the wearable computing device, wherein the first personal computing device comprises a display in a presentation mode of a plurality of different presentation modes related to operation of the personal computing device and wherein the first message does not cause the presentation mode of the personal computing device to change;

detecting a second user input;

determining that the second user input is a second covert input of a second type of the plurality of covert input types, wherein determining that the second user input is the second covert input of the second type of the plurality of covert input types comprises detecting a second touch of a second type on the touch-screen display for a predetermined period of time and wherein the second type of the second covert input is different from the first type of the first covert input;

in response to determining that the second user input is of the second type, generating a second message corresponding to the second covert input wherein generating the second message comprises adding an urgency status indicator and destination information corresponding to the second covert input, wherein the urgency status indicator and destination information of the second message are determined based on the second user input being of the second type and are different from the urgency status indicator and destination information of the first message;

transmitting, to the first computing device, the second message without altering the presentation mode of the display of the wearable computing device and wherein the second message does not cause the presentation mode of the first personal computing device to change;

receiving, from the first personal computing device, a first response message received by the first personal computing device in response to the first message and originating from a system associated with the destination information of the first message, the first response message comprising a control field including a command to enable a feature of the wearable computing device; and enabling the feature of the wearable computing device based on the command in the control field of the first response message.

19. A system comprising:

a wearable computing device comprising:
   a first communication interface configured to communicate with a personal computing device; and
   a first processor, coupled to the first communication interface, configured to:
      place a display the wearable computing device in a wearable computing device presentation mode of a plurality of different presentation modes related to operation of the wearable computing device, wherein the wearable computing device comprises a touch-screen display, the processor is configured to operate as a watch;
      detect a first user input;
      determine that the first user input is a first covert input of a first type of a plurality of covert input types, wherein determining that the first user input is the first covert input of the first type of the plurality of covert input types comprises detecting a first touch of a first type on the touch-screen display for a predetermined period of time;
      in response to determining that the first user input is of the first type, generate a first message corresponding to the first covert input wherein generating the first message comprises adding an urgency status indicator and destination information corresponding to the first covert input, wherein the urgency status indicator and destination information of the first message are determined based on the first user input being of the first type;
      transmit, to the personal computing device, the first message without altering the wearable computing device presentation mode;
      detect a second user input;
      determine that the second user input is a second covert input of a second type of the plurality of covert input types, wherein determining that the second user input is the second covert input of the second type of the plurality of covert input types comprises detecting a second touch of a second type on the touch-screen display for a predetermined period of time and wherein the second type of the second covert input is different from the first type of the first covert input;
      in response to determining that the second user input is of the second type, generate a second message corresponding to the second covert input wherein generating the first message comprises adding an urgency status indicator and destination information corresponding to the first covert input, wherein the urgency status indicator and destination information of the second message are determined based on the second user input being of the second type and are different from the urgency status indicator and destination information of the first message; and
      transmitting, to the personal computing device, the second message without altering the wearable computing device presentation mode;

the personal computing device comprising:
   a second communication interface configured to communicate with the wearable computing device; and
   a second processor, coupled to the second communication interface, configured to:
      place a display of the personal computing device in a presentation mode of a plurality of different presentation modes related to operation of the personal computing device;
      receive the first message;
      determine that the first message corresponds to the first covert input;
      determine that the first message comprises destination information corresponding to a second computing device;
      transmit, to the second computing device, the first message without altering the presentation mode of the display of the personal computing device;
      receive the second message;
      determine that the second message corresponds to the second covert input;
      determine that the second message comprises destination information corresponding to a third computing device;
      transmit, to the third computing device, the second message without altering the presentation mode of the display of the personal computing device;
      receive, from the second computing device, a first response message in response to the first message, the first response message comprising a control field including a command to enable a feature of the wearable computing device;
      transmit the first response message to the wearable computing device, wherein the wearable computing device enables the feature of the wearable computing device based on the command in the control field of the first response message;
      receive, from the wearable computing device in response to the first response message information related to the feature of the wearable computing device; and
      transmit, to the second computing device, the received information related to the feature of the wearable computing device.

* * * * *

UNITED STATES PATENT AND TRADEMARK OFFICE
CERTIFICATE OF CORRECTION

PATENT NO.        : 10,154,391 B2
APPLICATION NO.   : 14/809734
DATED             : December 11, 2018
INVENTOR(S)       : John H. Yoakum and Tony McCormack It is certified that error appears in the above-identified patent and that said Letters Patent is hereby corrected as shown below:

In the Claims

At Column 14, Line 7, Claim 6, delete "interne" and insert --internet-- therein.

Signed and Sealed this
Nineteenth Day of February, 2019

Andrei Iancu
*Director of the United States Patent and Trademark Office*